United States Patent
Kim et al.

(10) Patent No.: US 6,479,604 B1
(45) Date of Patent: Nov. 12, 2002

(54) DIARYLETHENE COMPOUND, PHOTOCHROMIC DIARYLETHENE TYPE COPOLYMER AND METHOD FOR THE PRODUCTION OF THE SAME

(75) Inventors: Eun-Kyoung Kim; Yun-Ki Choi, both of Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 09/492,619

(22) Filed: Jan. 27, 2000

Related U.S. Application Data (63) Continuation-in-part of application No. 09/374,667, filed on Aug. 16, 1999, now abandoned.

(30) Foreign Application Priority Data

Aug. 17, 1998 (KR) .......................................... 98-33238

(51) Int. Cl.[7] ................................................ C08F 12/20
(52) U.S. Cl. .................... 526/242; 526/319; 526/329.7; 526/346; 526/347; 526/219.6; 526/227; 430/19; 430/495.1; 430/962; 549/462; 549/57; 548/455
(58) Field of Search .................... 549/462, 57; 548/455; 430/19, 495.1, 962; 526/242, 227, 329.7, 219.6, 319, 346, 347

(56) References Cited

U.S. PATENT DOCUMENTS 5,376,511 A * 12/1994 Tatezono et al. ............ 430/495

FOREIGN PATENT DOCUMENTS

| JP | 61-263935 | 11/1986 |
|----|-----------|---------|
| JP | 3-135977 | 6/1991 |
| JP | 3-261762 | 11/1991 |
| JP | 3-261781 | 11/1991 |
| JP | 3-261782 | 11/1991 |
| JP | 4-178382 | 6/1992 |
| JP | 4-178383 | 6/1992 |
| JP | 5-11406 | 1/1993 |
| JP | 5-59025 | 3/1993 |
| JP | 5-169820 | 7/1993 |
| JP | 5-301873 | 11/1993 |
| JP | 6-199846 | 7/1994 |
| JP | 6-240242 | * 8/1994 |
| JP | 6-267071 | 9/1994 |
| JP | 7-72567 | 3/1995 |
| JP | 7-89954 | 4/1995 |
| JP | 8-69083 | 3/1996 |
| JP | 8-245579 | 9/1996 |
| JP | 9-61647 | 3/1997 |
| JP | 9-71585 | 3/1997 |
| JP | 9-77743 | 3/1997 |
| JP | 9-77767 | 3/1997 |
| JP | 9-80681 | 3/1997 |

OTHER PUBLICATIONS

Kim et al. Macromolecules, 32, 4855–4860, 1999.*
Bell, Scott I., et al. "Metalation and Alkylation of 3,6–Dihydrothiazine 1–Oxides Prepared via Diels–Alder Cycloadditions of N–Sulfinyl Dienophiles", *J. Org. Chem*, vol. 56, pp. 373–377 (1991).
Takeshita, Michinori, et al., "Novel Saccharide Tweezers With a Diarylethene Photoswitch", *Chem. Commun.*, pp. 1807–1808 (1996).

* cited by examiner

*Primary Examiner*—David W. Wu
*Assistant Examiner*—Ling-Siu Choi
(74) *Attorney, Agent, or Firm*—Ladas & Parry (57) ABSTRACT

A diarylethene compound of the following formula (1)

wherein $R_1$ is a hydrogen or a substituted or unsubstituted $C_{1-22}$ alkyl group, a fluoro group, a substituted or unsubstituted phenyl group, a substituted or unsubstituted phenylalkyl group, $R_2$ is a $C_{1-22}$ alkylene group which may be unsubstituted or substituted with fluorine, $R_3$ is a chemical bond, O, S, $NR_1$, $N(R_2R_1)$, or a $C_{1-3}$ alkylene group which may be unsubstituted or substituted with one or more oxygen atoms or fluorine atoms, X and Y independently of one another O, S, nitrogen, $NR_1$, or $N(R_2R_1)$, and Z is a carbonyl group or a methylene group which may be unsubstituted or substituted with fluorine.

22 Claims, 1 Drawing Sheet

DIARYLETHENE COMPOUND, PHOTOCHROMIC DIARYLETHENE TYPE COPOLYMER AND METHOD FOR THE PRODUCTION OF THE SAME

This application is a continuation-in-part of U.S. application Ser. No. 09/374,667 (filed Aug. 16, 1999), now abandoned, which is incorporated herein by this reference.

BACKGROUND OF THE INVENTION

1. Field of the Invention

The present invention relates to a diarylethene compound, a photochromic diarylethene type copolymer and a method for the production of the same. The photochromic diarylethene type copolymer according to the present invention exhibits excellent adhesive properties and processabilities and fast photo-induced color change and thus is useful in applications such as optical recording media, photochromic windows, display elements, plastic mirrors, photochromic filters, photo switches, photosensitive drums, recording elements, solar batteries, lenses, cosmetics, fibers or optical parts.

2. Background of the Invention

The diarylethene type photochromic compounds have been known to be stable photochromic compounds which do not exhibit any heat-induced color change after being exposed to radiation of light since they were synthesized in 1985 (Japanese Patent Laid-Open Publication No. 86-263935 A2, J. Org. Chem., 1991, 49, 373). In accordance with the synthesis of diarylethene type photochromic compounds, various types of derivatives have been synthesized and suggested for use in applications such as reversible optical disks, erasable optical disks, photo switches for optical integrated elements, organic photosensitizers and photo electrodes (Japanese Patent Laid-Open Publication Nos. 91-261782 A2, 91-261781 A2, 91-261762 A2, 92-178383 A2, 92-178382 A2, 94-199846 A2, 91-135977 A2, 93-59025 A2, 93-169820 A2, 93-11406 A2, 93-301873 A2, 94-267071 A2, 95-72567 A2, 96-69083 A2, 96-245579 A2, 97-61647 A2, 97-80681 A2; Takeshita, M; Uchida, K.; Irie, M. Chem. Commun, 1996, 1807–1808).

Said diarylethene type compounds refer to compounds which, when exposed to the radiation of ultraviolet rays, change color and then return to their original color when exposed to radiation of a different wavelength. Various types of photochromic compounds have been suggested for use in applications in which a color change or darkening is induced by light (Japanese Patent Laid-Open Publication Nos. 95-89954 A2, 97-71585 A2, 97-77743 A2, 97-77767 A2 and 93-301873 A2).

Among them, fluorine-substituted diarylethenes or maleic anhydride-substituted diarylethenes are known to show high thermal stability, fast photo-induced color change, and accordingly methods for the production of optical recording film, in which the compounds are dissolved in a polymer resin and then coated by means of a solution coating method, were reported (J. Org. Chem., 1991, 49, 373).

However, when low molecular weight diarylethene compounds are introduced into a polymer resin, the compatibility of the compounds with a resin is insufficient, thereby resulting in the aggregation of the photochromic diarylethene compounds in the polymer medium to cause a phase separation. For this reason, the reliability and storage stability of the optical recording became insufficient to be used for long term use. In particular, when the low molecular weight diarylethene compounds are used in any applications related to photonic devices utilizing refractive index change by the reversible photochromic property, such phase separation problem of the low molecular weight diarylethenes causes poor reproductivity in their photochromic properties and refractive index change and errors in the signal processing and interpreting the signals.

In order to solve these problems, polymers having, as a branched chain, diarylethenes bound polymethacrylate system, have been developed (Japanese Patent Laid-Open Publication No. 06-240242 A2). However, such polymers have drawbacks in that (1) the synthesis of the diarylethene methacrylate monomer is complex due to its low temperature reaction, (2) the mechanical properties of thus prepared polymers are poor and (3) the adhesive property of thus prepared polymers on a glass plate or plastic plates such as PC, PMMA and PE is insufficient.

In addition, since such polymers are substituted with alkylenes which contain hydrogens or fluorines between the diarylethene and the methacryl groups, the polar excited state structure, formed when the diarylethene group is excited by the exposure to radiation of light, cannot be stabilized. Therefore, such polymer restricts the use of the polymers in applications such as a photochromic thin film utilizing the polarity of the excited state such as the rapid change in their refractive index within extremely short time.

SUMMARY OF THE INVENTION

The present inventors have made extensive studies in order to overcome the aforementioned problems caused in the preparation of the diarylethene type polymers and to develop a diarylethene type polymer which can be easily synthesized and isolated and which is also connected by a polar group such as a carboxyl group and which possesses excellent photochromic properties and mechanical properties and finally is capable of solving the problems associated with the phase separation or the formation of aggregate. As a result, the present inventors have now found that a photochromic polymer of the formula (4), which possesses excellent mechanical properties and processabilities as well as exhibiting fast photo-induced color change, can be prepared by polymerizing a diarylethene monomer of the formula (1) wherein benzene ring is substituted with W—R$_2$OC(=O)— (wherein W is methacryl or acryl group), in the presence of an initiator, with at least one selected from the group consisting of a styrene type monomer of the formula (2) below and a compound of the formula (3) below. The present inventors have also found that thus prepared polymer may be dissolved in an organic solvent to form a composition, which may then be used to obtain a photochromic thin film. The present invention is attained on the basis of these findings.

DETAILED DESCRIPTION

Accordingly, the first objective of the present invention is to provide a diarylethene compound of the formula (1)

wherein $R_1$ is a hydrogen or a substituted or unsubstituted $C_{1-22}$ alkyl group, a fluoro group, a substituted or unsubstituted phenyl group, a substituted or unsubstituted phenylalkyl group, $R_2$ is a $C_{1-22}$ alkylene group which may be unsubstituted or substituted with fluorine, $R_3$ is a chemical bond, O, S, $NR_1$, $N(R_2R_1)$, or a $C_{1-3}$ alkylene group which may be unsubstituted or substituted with one or more oxygen atoms or fluorine atoms, X and Y independently of one another O, S, nitrogen, $NR_1$, or $N(R_2R_1)$, and Z is a carbonyl group or a methylene group which may be unsubstituted or substituted with fluorine.

By way of example, but not by way of limitation, $R_1$ may be methyl, ethyl, propyl, butyl, pentyl, hexyl, heptyl, octyl, nonyl, decyl, fluoromethyl, fluoroethyl, fluoropropyl, fluorobutyl, fluoropentyl, fluorohexyl, fluoroheptyl, fluorooctyl, fluorononyl, fluorodecyl, etc.

By way of example, but not by way of limitation, $R_2$ may be $(CH_2)_n$, $[CH_2C(R_1)H]_n$, $[CH_2C(R_1)_2]_n$, $(CF_2)_n$, $[CF_2(CR_1)H]_n$, $[CH_2C(R_1)_2]_n$, $[CF_2C(R_1)F]_n$, in which n=1 to 22 or 2–22. For example, $R_2$ may be $CH_2CH_2$, $CH_2CH_2CH_2$, $CH_2CH_2CH_2CH_2$, $CH_2CH_2CH_2CH_2CH_2$, $CH_2CH_2CH_2CH_2CH_2CH_2$, $CH_2C(CH_3)H$, $CH_2CH_2C(CH_3)H$, $CH_2CH_2CH_2C(CH_3)H$, $CH_2CH_2CH_2CH_2CH_2C(CH_3)H$, $CF_2CF_2CF_2CF_2CF_2CF_2$, $CH_2CF_2CF_2CF_2CF_2CH_2$, $CH_2CF_2CF_2CF_2CF_2CH_2(CH_3)H$, $CH_2CF_2CF_2CF_2CF_2CH_2C(CF_3)H$, $CH_2CF_2CF_2CF_2CF_2CH_2C(CF_3)F$, $CH_2(CF_3)FCF_2CF_2CF_2CF_2CH_2C(CF_3)F$, $CH_2C(CF_3)FCF_2CF_2CF_2CH_2C(CF_3)F$, etc.

By way of example, but not by way of limitation, $R_3$, X, and Y, independently of each other, may be O, S, $NR_1$, $N(R_2R_1)$, $CH_2$, $CF_2$, $CF_2CF_2$, $CF_2CF_2CF_2$, $CF(CF_3)$, $CH_2CH_2$, $CF_2CH_2CF_2$, $CF(CH_3)$, etc.

By way of example, but not by way of limitation, Z may be C=O, $CH_2$, $CF_2$, etc.

As shown above in formula (1), the diarylethene compound of the formula (1) is substituted with $W—R_2OC(=O)—$ (wherein W is a methacryl or acryl group) at the benzene ring of the diarylethene.

The second objective of the present invention is to provide a method for the production of the photochromic diarylethene represented by the formula (1)

wherein $R_1$, $R_2$, $R_3$, X, Y and Z are defined as above, which comprises reacting a diarylethene compound of the formula (5)

wherein $R_3$, X, Y and Z are defined as above, with acetyl chloride to form a mono acetyl-substituted diarylethene of the formula (6)

wherein $R_3$, X, Y and Z are defined as above, hydrating the resulting mono acetyl-substituted diarylethene and then lo reacting the resulting hydration product in an organic solvent with an optional catalyst at approximately room temperature for approximately 5 hours (or at approximately –10° C. to approximately 150° C., or approximately –10° C. to approximately 100° C., or approximately 10° C. to approximately 30° C., or approximately 18° C. to approximately 24° C. for approximately 0.5 to approximately 24 hours, or approximately 1 to approximately 10 hours, or approximately 4 to approximately 6 hours) with a methacryl- or acryl-substituted alkylene alcohol of the formula (7)

wherein $R_1$ and $R_2$ are defined as above, to obtain a diarylethene compound of the formula (1).

By way of example, but not by way of limitation, the organic solvent may be an alcohol, tetrahydrofuran (THF), or preferably dichloromethane, or any other suitable organic solvent, including any of the organic solvents defined below.

By way of example, but not by way of limitation, the catalyst may be N,N-dicyclohexylcarbodiimide (DDC), dimethylaminopyridine (DMAP), NaOH, $Na_2CO_3$, pyridine, or any other suitable catalyst. Preferably the catalyst is N,N-dicyclohexylcarbodiimide (DDC) and/or dimethylaminopyridine (DMAP).

The third objective of the present invention is to provide a photochromic diarylethene type copolymer represented by the formula (4)

wherein $R_1$, $R_2$, $R_3$, X, Y and Z are defined as above, $R_4$ is the same as $R_1$, or is a $C_{1-22}$ alkylene or akyleneoxyalkyl ester which may be unsubstituted or substituted with fluorine, said alkylene group or alkyleneoxyalkyl ester group may be substituted with at least one selected from the group consisting of a methacryl group, an acryl group and a difluoroacryl, $R_5$ is the same as $R_2$, or a $C_{1-22}$ alkyleneoxy group which may be unsubstituted or substituted with fluorine, and o, p, q and r independently of one another are a number from 0 to 1 and represent the molar fraction, provided that they should meet the requirement that o+p+q+r=1 and o is not 0.

Thus, o may be about 0.01 to about 0.99 (or about 0.05 to about 0.8, or about 0.3 to about 0.5); p may be about 0 to about 0.99 (or about 0 to about 0.8, or about 0.1 to about 0.7); q may be about 0 to about 0.99 (or about 0 to about 0.8, or about 0.1 to about 0.7); and r may be about 0 to about 0.99 (or about 0 to about 0.8, or about 0.1 to about 0.7, or about 0 to about 0.1).

The diarylethene type copolymer of the formula (4) according to the present invention possesses excellent photochromic properties, for example fast photo-induced color change.

The diarylethene type copolymer of the formula (4) according to the present invention can be prepared from a diarylethene compound of the formula (1) and at least one selected from the group consisting of a styrene type monomer of the formula (2) below and a compound of the formula (3) below.

Accordingly, the fourth objective of the present invention is to provide a method for the production of the photochromic diarylethene type copolymer of the formula (4)

wherein $R_1$, $R_2$, $R_3$, $R_4$, $R_5$, X, Y. Z, o, p, q and r are defined as above, which comprises mixing a diarylethene compound of the formula (1), wherein $R_1$, $R_2$, $R_3$, X, Y and Z are defined as above, and at least one selected from the group consisting of a styrene type monomer of the formula (2)

wherein $R_1$ is defined as above, and a compound of the formula (3)

wherein $R_1$ and $R_4$ are defined as above, in an organic solvent, adding a heat-curing agent to the resulting solution and then slowly heating the resulting mixture in the presence of a radical polymerization initiator at a temperature in the range from approximately 30° C. to approximately 400° C. for approximately 0.5 to approximately 10 hours (or approximately 30° C. to approximately 400° C. for approximately 0.5 to approximately 150 hours, preferably approximately 30° C. to approximately 150° C. for approximately 2 to approximately 100 hours, or more preferably approximately 40° C. to approximately 120° C. for approximately 5 to approximately 50 hours) to obtain a photochromic diarylethene type copolymer of the formula (4).

"Heat-curing agent" in the present invention means any reagent that can initiate or participate in curing or polymerization of monomers. Accordingly, a heat-curing agent may be a thermal initiator.

"Radical polymtrization initiator" in the present invention means any initiator which can generate radicals to lead polymerization. By way of example, but not by way of limitation, the radical polymerization initiator may be AIBN (2,2'-azobisisobutiyronitrile), IPP (Diisopropylperoxydicarbonate), BPO (dibenzoylperoxide), DTBPO (di-tert-butylperoxide), etc.

By way of example, but not by way of limitation, the "organic solvents" used in the present invention may be tetrahydrofuran, toluene, $C_1$–$C_{10}$ alcohol, acetonitrile, acetone, dimethyl sulfoxide, dimethylformamide, methylnaphthalene, methoxynaphthalene, chloronaphthalene, diphenylethane, ethylene glycol, quinoline, dichlorobenzene, dichlorotoluene, propylene carbonate, sulfolane, or xylene.

For example, when the diarylethene-type copolymer of the formula (4) is produced according to the present invention, the organic solvent may be used at a rate of about 0 to about 99% by weight, preferably about 0 to about 90% by weight, more preferably about 10 to about 80% by weight on the basis of the total amounts of the reactants or the mixture; and the heat-curing agent may be used at a rate of about 0.001 to about 20% by weight, preferably about 0.005 to about 10% by weight, more preferably about 0.01 to about 5% by weight on the basis of the total amounts of the reactants or the mixture.

According to one aspect of the present invention, the diarylethene type copolymer of the formula (4) can be prepared by the reaction of said monomer compounds in the presence of a radical polymerization intitiator at a temperature of approximately 30° C. to approximately 400° C. for approximately 0.5 to approximately 10 hours (or approximately 30° C. to approximately 400° C. for approximately 0.5 to approximately 150 hours, preferably approximately 30° C. to approximately 150° C. for approximately 2 to approximately 100 hours, or more preferably approximately 40° C. to approximately 120° C. for approximately 5 to approximately 50 hours) in the presence of at least one solvent selected from the group consisting of tetrahydrofuran, toluene, $C_{1-10}$ alcohol, acetonitrile, acetone, dimethyl sulfoxide, dimethylformamide, α-methylnaphthalene, methoxynaphthalene, chloronaphthalene, diphenylethane, ethylene glycol, quinoline, dichlorobenzene, dichlorotoluene, propylene carbonate, sulfolane, xylene, and any other suitable solvent.

Alternatively, the copolymer of the present invention can be prepared by a direct heat curing reaction in the presence of a radical polymerization initiator and in the absence of solvent at a temperature in the range preferably from about 50° C. to about 200° C. (or about 30° C. to about 300° C., or about 40° C. to about 200° C.).

The present invention also provides a composition comprising a diarylethene compound of the formula (1) in order to prepare the diarylethene type copolymer of the formula (4) according to the present invention, a styrene type monomer of the formula (2) and a compound of the formula (3). For example, the composition may comprise about 0.01 to about 99% (or about 0.05 to about 90%, or about 0.3 to about 70%) of the compound of formula (1) by weight of the composition. The composition may also comprise about 0 to about 90% (or about 10 to about 80%, or about 15 to about 70%) of the compound of formula (2) by weight of the composition. In addition, the composition may comprise about 0 to about 90% (or about 0 to about 80%, or about 10 to about 80%, or about 15 to about 70%) of the compound of formula (3) by weight of the composition.

The composition of the present invention further comprises at least one solvent selected from the group consisting of tetrahydrofuran, toluene, $C_{1-10}$ alcohol, acetonitrile, acetone, dimethylsulfoxide, dimethylformamide, α-methylnaphthalene, methoxynaphthalene, chloronaphthalene, diphenylethane, ethyleneglycol, quinoline, dichlorobenzene, dichlorotoluene, propylenecarbonate, sulfolane and xylene.

The present invention provides a photochromic thin film consisting of the diarylethene type copolymer of the formula (4). The photochromic thin film can be prepared by either heating or photo cross-linking of a composition comprised of a diarylethene compound of the formula (1), a styrene monomer of the formula (2) and a compound of the formula (3) in the absence or presence of a solvent and in the presence of an initiator. Thus prepared photochromic thin film possesses excellent mechanical properties and exhibits fast photo-induced color change. The thickness of a "thin film" may be about 0.5 to about 500 microns (or about 10 to about 250 microns, or about 50 to about 150 microns).

The diarylethene compound of the formula (1) used in the present invention can be produced by reacting the diarylethene which is commercially available or prepared by known methods with an acetylchloride to form a monoacetyl-substituted diarylethene, which is hydrated and then reacted with a methacryl substituted alkylene alcohol. Generally, the diarylethene compound of the formula (1) can be obtained in a yield of more than 90%.

For example, 1-[6'-(methacryloyloxyethyloxycarbonyl)-2'-methylbenzo[b]thiophen-3'-yl]-2-(2"-methylbenzo[b]thiophen-3"-yl)hexafluorocyclopentene is prepared from 1,2-bis(2-methylbenzo[b]thiophen-3-yl)hexafluoro cyclopentene.

Specifically, aluminium trichloride ($AlCl_3$) is slowly added dropwise to a solution of 1,2-bis(2-methylbenzo[b]thiophen-3-yl)hexafluorocyclopentene and acetyl chloride in nitrobenzene at room temperature and allowed to react at room temperature for 5 hours. To the reaction mixture, water is then added to halt the reaction. The resulting mixture was extracted with chloroform to obtain 1-(6'-acetyl-2'-methylbenzo[b]thiophen-3'-yl]-2-(2"-methylbenzo[b]thiophen-3"-yl)hexafluorocyclopentene in a yield of 84%. The obtained product is dissolved in dioxane and the resulting solution slowly added dropwise to a mixed solution of sodium hypochlorite/dioxane at a temperature of between 30 and 80° C. The resulting reaction mixture is continuously subjected to reaction at a temperature of 50 to 110° C. for 0.5 to 10 hours and then purified to obtain 1-(6'-carboxy-2'-methylbenzo[b]thiophen-3'-yl]-2-(2"-methylbenzo[b]thiophen-3"-yl)hexafluorocyclo pentene in a yield of 99%.

The obtained 1-(6'-carboxy-2'-methylbenzo[b]thiophen-3'-yl]-2-(2"-methylbenzo[b]thiophen-3"-yl) hexafluorocyclopentene is dissolved in 2-hydroxyethyl methacrylate, dicyclohexylcarbodiimide, dimethylaminopyridine and dichloromethane. The solution was stirred at room temperature to obtain 1-[6'-(methacryloyloxyethyloxycarbonyl)-2'-methylbenzo[b]thiophen-3'-yl]-2-(2"-methylbenzo[b]thiophen-3"-yl)hexafluorocyclopentene in a yield of 92%. The compounds of the formulae (2) and (3) according to the present invention are commercially available.

The aforementioned photochromic polymer according to the present invention can be prepared by the reaction characterized by dissolving a diarylethene compound of the formula (1) and at least one compound selected from the group consisting of a compound of the formula (2) and a compound of the formula (3) in an organic solvent, adding a heat curing agent to the resulting mixture, and then reacting the resulting mixture at a temperature in the range from 30° C. to 400° C. (preferably 30° C. to 150° C., or more preferably 40° C. to 120° C.) for 0.5 to 48 hours (preferably 2 to 10 hours, or more preferably 5 to 50 hours) whilst increasing temperature slowly. By way of example, but not by way of limitation, the organic solvent may be THF, toluene, benzene, ethylbenzene, diphenylether, or any other suitable organic solvent, but preferably THF and/or toluene; the heat-curing agent may be dibenzoylperoxide (BPO), azobisisobutyronitrile (AIBN), di-t-butylperoxalate (DTBPO), or any other suitable heat-curing agent, but preferably azobisisobutyronitrile (AIBN). Typically, the photochromic diarylethene styrenoic polymer of the present invention can be prepared by dissolving 38% by weight of 1-[6'-(methacryloyloxyethyloxycarbonyl)-2'-methylbenzo[b]thiophen-3'-yl]-2-(2"-methylbenzo[b]thiophen-3"-yl) hexafluoro cyclopentene, 40% by weight of styrene and 22% by weight of butyl methacrylate in tetrahydrofuran, adding a heat curing agent to the resulting mixture and then subjecting the resulting mixture to heat reflux under a nitrogen atmosphere. The weight average molecular weight of thus prepared polymer is 10500 when calculated on the basis of polystyrene. As the dispersibility ($M_w/M_n$) of thus prepared polymer is 1.49, the polymer can be dissolved in a solution to form a photochromic polymer of which processing is easy.

According to the analysis by TGA illustrating the weight loss of the copolymer prepared from 22% by weight of 1-[6'-(methacryloyl oxyethyloxycarbonyl)-2'-methylbenzo[b]thiophen-3'-yl]-2-(2"-methylbenzo[b]thiophen-3"-yl) hexafluorocyclopentene against heat, the temperature at which the copolymer exhibits 10% by weight of weight loss is higher than 350° C., which illustrates that the copolymer possesses high thermal stability. The diarylethene type polymer provided by the present invention can be dissolved in a common solvent such as toluene, xylene, chloroform and lower alcohol or a mixture of them.

When the thin film is prepared by the use of the diarylethene type copolymer possessing high thermal stability, it may be prepared by the use of 1 to 70% by weight of the copolymer of the present invention and 30 to 99% by weight of a mixture of at least one or two solvents selected from the group consisting of common organic solvents such as toluene, chloroform, hexane, acetone, lower alcohol, 1,2-dichloroethane, methylethylketone, sulfolane, xylene and 3-nitro-α,α,α-trifluoronitro.

Besides said solvents, at least one further compound selected from the group consisting of tetraalkoxysilane, trialkoxyglycidylsilane, tetraalkoxytitanium, hydrochloric acid and organic acid; or at least one resin selected from the group consisting of polyolefin, polystyrene, polyvinyl butyral, polycarbonate, polyester, polyacrylate and polyurethane may further be used.

Besides said solvents, at least one high boiling point solvent selected from the group consisting of α-methylnaphthalene, methoxynaphthalene, chloronaphthalene, diphenylethane, diethylene glycol, sulfolane, quinoline, dichlorobenzene, dichlorotoluene, propylenecarbonate and xylene may further be used.

The component ratio of the diarylethene type copolymer according to the present invention to said solvent can vary according to the intended use. In the case where the diarylethene type copolymer is used for the production of the photochromic thin film as mentioned below, the diarylethene type copolymer of the formula (4) may be used in an amount of greater than about 0 and less than about 100% by weight (e.g., about 0.01 to about 99.99% by eight, preferably about 5 to about 70% by weight, more preferably about 10 to about 50% by weight) based on the total weight of the composition (e.g., the total weight of the copolymer, the solvent, and any other components of the composition). It is preferred that other components may be used in the composition an amount of 0 to 99% by weight of the composition. If the component ratio of said diarylethene type copolymer exceeds the aforementioned component ratio range, the mechanical properties of the thin film to be prepared become disadvantageously deteriorated. Furthermore, if the diarylethene type copolymer of the present invention is used as a light stabilizer or for any other use in cosmetics, fibers, clay or other compositions, it may used in trace amounts from about 0.01% by weight of the composition to about several ppm (or about 0.01 to about 100% by weight, or about 0.01 to about 99.99% by weight, preferably about 5 to about 70% by weight, or more preferably about 10 to about 50% by weight).

The diarylethene type copolymer of the present invention may include further various additives, lubricants and thickeners well known to a person skilled in the art in order to improve the heat resistance properties, mechanical properties and processing properties of the copolymer. The present invention may use any materials as additives that can improve mechanical, photochromic, rheological or thermal properties of the solutions, the films, and the articles containing diarylethene. Such additives may include, for example, clays, siloxane polymers, antioxidants, hindered amine light stabilizer or UV stabilizers, adhesion promoters, etc.

The lubricants may help processibility, transport of light, etc. By way of example, but not by way of limitation, the lubricants may include ethoxylate urethane, silixane polymers, glycols, etc.

The thickeners may improve processibility, control of film thickness, control of flow, etc. By way of example, but not by way of limitation, the lubricants may include cellulose, clays, polyacrilic acids, polyacrylates, etc.

It is a further objective of the present invention to provide a photosensitive thin film which possesses sensitivity against ultraviolet rays, visible light and near infrared light in the range of 200 to 800 nm by the use of the said diarylethene type copolymer.

The mixture of the diarylethene type copolymer and solvent as mentioned above can be applied onto a general support such as plastic resins, glass plates, aluminum plates or conductive glasses to obtain a diarylethene type polymer thin film which show high absorbance in the wavelength range of 200 to 500 nm. When thus prepared thin film is exposed to light such as sunlight or ultraviolet rays, a diarylethene type copolymer thin film which shows high absorbance in the wavelength of 300 to 800 nm is obtained. The coating may be conducted by employing either a roll coating, a spin coating, a bar coating, a spray coating or a dip coating method.

The photochromic thin film may also be produced by dissolving the diarylethene type copolymer of the formula (4) of the present invention in at least one solvent selected from the group consisting of ether, alcohol, aromatic hydrocarbon, monoterpene hydrocarbon and liquid paraffin and then either by processing the resulting solution or by mixing the solution together with multipurpose polymer such as polyvinylbutyral or polycarbonate to mill the resulting mixture and finally applying the mixture to a support.

The term "multipurpose polymer" in the present invention means a polymer which can be utilized in several applications. In the case of the diarylethene polymer, the polymer can be utilized in optical recording, switches, grating devices or a device which has multi functions such as color-changeable signal transfer.

The diarylethene type copolymer provided by the present invention is capable of being processed, shows absorption peaks in the wavelength range of about 200 to about 800 nm and a thermal stability (approximately 10% decomposition temperature, $T_{10}$) of higher than about 350° C., and thus is useful in applications such as display elements, photo switch elements, optical integrated elements, solar batteries, sensors and other recording elements and optical parts, which are included in the scope of the present invention.

EXAMPLE

The present invention is described in more detail by referring to the following examples without limiting the scope of the invention in any way.

Examples 1 to 4

Preparation of Substituted Diarylethene Monomer

Example 1

Synthesis of 1-(6'-Acetyl-2'-methylbenzo[b]
thiophen-3'-yl)-2-(2"-methylbenzo[b]thiophen-3"-yl)
hexafluorocyclopentene 2.67 g of 1,2-bis(2-methylbenzo[b]thiophen-3-yl) hexafluorocyclopentene synthesized by a known method and 0.8 ml of acetyl chloride were dissolved in 40 ml of nitrobenzene and to the resulting mixture, 2.28 g of $AlCl_3$ was slowly added at room temperature. The resulting mixture was reacted at room temperature for 5 hours. Water was added to halt the reaction and then the reaction mixture was extracted with chloroform. After the organic layer was maintained over $MgSO_4$ to remove water and then the solvent was removed under reduced pressure, the remaining organic portion was subjected to column chromatography (20% ethyl acetate-hexane) to obtain 2.44 g of 1-(6'-acetyl-2'-methylbenzo[b]thiophen-3'-yl)-2-(2"-methylbenzo[b] thiophen-3"-yl)hexa-fluorocyclopentene. Yield: 84%.

m.p =62° C.; IR (KBr, $Cm^{-1}$); 1684 (—CO group) $^{1}$H-NMR (300 MHz, $CDCl_3$) δ8.29–7.54(4H), 7.39–7.17 (3H), 2.63(3H), 2.56–2.46(3H), 2.24, 2.20(3H); $^{13}$C-NMR δ15.6, 15.9, 27.1, 119.3, 119.7, 122.3, 122.4, 122.6, 123.2, 123.5, 124.7, 124.9, 125.1, 133.7, 138.5, 138.6, 142.0, 143.1, 147.9, 197.6; MS(m/z); 510($M^+$, 100), 495(67), 452 (10), 419(13), 84(71); High-resolution MS; $C_{25}H_{16}OF_6S_2$ calculated: 510.0547 determined: 510.0529.

Example 2

Synthesis of 1-(6'-Carboxy-2'-methylbenzo[b]
thiophen-3'-yl)-2-(2"-methylbenzo[b]thiophen-3"-yl)
hexafluorocyclopentene 0.11 g of the 1-(6'-acetyl-2'-methylbenzo[b]thiophen-3'-yl)-2-(2"-methylbenzo[b]thiophen-3"-yl) hexafluorocyclopentene synthesized in Example 1 was dissolved in 0.7 ml of dioxane and the resulting solution was slowly added dropwise, while stirring, to a mixed solution of 2.8 ml (10% solution) sodium hypochlorite and 0.4 ml of dioxane at 50° C. The reaction mixture was further stirred at 80° C. for 2 hours, and saturated sodium carbonate was added to halt the reaction and then the resulting mixture was extracted with chloroform. After the organic layer was maintained over $MgSO_4$ to remove water, the solvent was removed under reduced pressure and then dried in a vacuum oven (60° C.) for 24 hours to obtain 1-(6'-carboxy-2'-methylbenzo[b]thiophen-3'-yl)-2-(2"-methylbenzo[b] thiophen-3"-yl)hexafluorocyclopentene in its colorless state and in a yield of 99%. Thus synthesized compound possesses melting point of 98° C. and shows a characteristic peak of —COOH at 1692 $Cm^{-1}$ in the infrared spectral absorption spectrum (KBr pellet).

$^{1}$H-NMR (300 MHz, $CDCl_3$) δ 8.46–7.53(4H), 7.34–7.19 (3H), 2.52, 2.48(3H), 2.27, 2.22(3H); $^{13}$C-NMR δ615.6, 15.9, 119.3, 119.8, 122.3, 122.6, 124.9, 125.1, 125.4, 125.7, 126.3, 126.4, 138.3, 138.5, 138.7, 142.7, 143.2, 148.2, 172.5; MS(m/z); 512($M^+$, 100), 482(11), 464(5), 445(11), 419(24) High-resolution MS; $C_{24}H_{14}O_2F_6S_2$ calculated: 512.0339. determined: 512.0352.

Example 3

Synthesis of 1-(6'-Methacryloyloxycarboxy-2'-
methyl benzo[b]thiophen-3'-yl)-2-(2"-methylbenzo
[b]thiophen-3"-yl)hexafluorocyclopentene 2.3 g of the 1-(6'-carboxy-2'-methylbenzo[b]thiophen-3'-yl)-2-(2"-methylbenzo[b]thiophen-3"-yl) hexafluorocyclopentene synthesized in Example 2, 0.69 ml of methacrylic acid 2-hydroxyester, 1.2 g of dicyclohexylcarbodiimide and 60 mg of dimethylaminopyridine were added to 50 ml of dichloroemethane and stirred at room temperature for 5 hours. The resulting mixture was diluted by adding 50 ml of dichloromethane and then washed with water to separate the dichloromethane layer. After removing the water with $MgSO_4$, the mixture was subjected to flash chromatography (10% ethyl acetate-hexane) to obtain 1-(6'-methacryloyl-oxycarboxy-2'-methylbenzo[b]thiophen-3'-yl)-2-(2"-methylbenzo[b]thiophen-3"-yl) hexafluorocyclopentene in its colorless state and in a yield of 92%.

m.p=52° C. IR (KBr, $Cm^{-1}$); 1723 (—COO—group) $^1$H-NMR (300 MHz, $CDCl_3$) δ 8.41–7.54(4H), 7.37–7.17 (3H), 6.15(s, 1H), 5.59(s, 1H), 4.63–4.49(m, 4H), 2.51, 2.47(3H), 2.24, 2.20(3H), 1.95(s, 1H) $^{13}$C-NMR δ15.6, 15.9, 18.7, 62.8, 63.3, 119.3, 119.7, 122.3, 122.6, 124.8, 124.9, 125.1, 126.0, 126.3, 126.6, 136.3, 138.2, 138.3, 138.6, 142.1, 143.1, 166.4, 167.6 MS(m/z); 624($M^+$, 100), 593(3), 495(43), 479(7), 419(4), 248(9) 113(55), 69(24) High-resolution MS; $C_{30}H_{22}O_4F_6S_2$ calculated: 624.0864-determined: 624.0862.

Example 4

Synthesis of 1-(6'-Methacryloyloxypolyethyleneoxycarboxy-2'-methylbenzo[b]thiophen-3'-yl)-2-(2"-methylbenzo[b]thiophen-3"-yl)hexafluorocyclopentene 2.3 g of the 1-(6'-carboxy-2'-methylbenzo[b]thiophen-3'-yl)-2-(2"-methylbenzo[b]thiophen-3"-yl) hexafluorocyclopentene prepared in Example 1, 1 g of methacrylatopolyethyleneoxycarboxylic acid (weight average molecular weight 350), 1.5 g of dicyclohexylcarbodiimide and 79 mg of dimethylaminopyridine were added to 60 ml of dichloromethane and stirred at room temperature for 5 hours. The resulting mixture was diluted by adding 60 ml of dichloromethane and washed with water to isolate the dichloromethane layer. The solvent was removed and then purified to obtain 1-(6'-methacryloyloxypolyethyleneoxycarboxy-2'-methylbenzo[b]-thio-phen-3'-yl)-2-(2"-methylbenzo[b]thiophen-3"-yl) hexafluorocyclopentene in its colorless state and in a yield of 90%.

Examples 5 to 7

Preparation of the Copolymer Substituted with Diarylethene Compounds

Example 5

Figure 1:
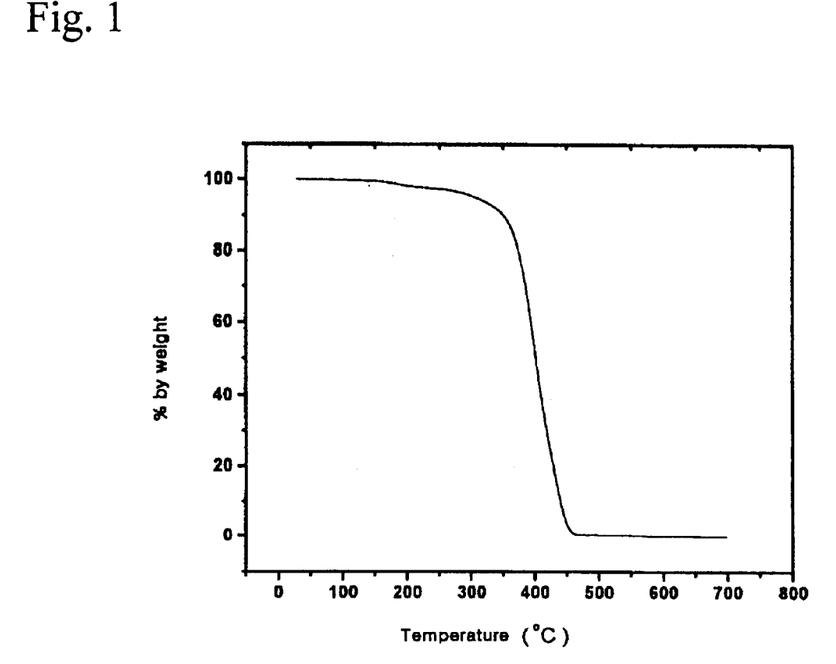
FIG. 1 is a thermogravimetric analysis exhibiting weight loss of the diarylethene styrenoic copolymer prepared in Example 5 against heat.

0.4 g of the diarylethene derivative prepared in Example 3, 0.89 g of styrene and 0.52 g of butyl methacrylate were dissolved in tetrahydrofuran and to this, 1% by weight of AIBN based on the total amount of monomolecules was added. The reactants were refluxed under a nitrogen atmosphere for 72 hours and cooled to room temperature. By removing the solvent under reduced pressure, a polymer was prepared. The polymer was reprecipitated by the use of ethyl ether and hexane and dried at 60° C. for 24 hours to prepare a diarylethenestyrene copolymer in a yield of 40%. The prepared polymer has a glass transition temperature of 66° C., weight average molecular weight of 11500 and dispersibility ($M_w/M_n$) of 1.60. Said polymer may easily be dissolved in a solution and can be used to prepare a photochromic polymer of which processing is easy. The thermogravimetric analysis exhibiting the thermal decomposition temperature is shown in FIG. 1.

Example 6

0.93 g of the diarylethene derivative prepared in Example 3, 0.91 g of styrene and 0.57 g of butyl methacrylate were dissolved in tetrahydrofuran and to this, 1% by weight of AIBN based on the total amount of monomolecules was added. The reactants were refluxed under a nitrogen atmosphere for 72 hours and cooled to room temperature. By removing the solvent under reduced pressure, a polymer was prepared. The polymer was reprecipitated by the use of ethyl ether and hexane and dried at 60° C. for 24 hours to prepare diarylethene styrene copolymer in a yield of 60%. The prepared polymer has a glass transition temperature of 77° C., weight average molecular weight of 10500 and dispersibility ($M_w/M_n$) of 1.49. Said polymer may be easily dissolved in a solution and be used to prepare a photochromic polymer of which processing is easy.

Example 7

A copolymer was prepared by repeating the same procedure as in Example 5 except that the diarylethene derivative prepared in Example 4 was used in place of the diarylethene derivative prepared in Example 3 and stirred for 90 hours. The yield of thus prepared copolymer was 56%.

Example 8

0.69 g of the diarylethene derivative prepared in Example 3, 0.35 g of bisallylcarbonate (CR-39, including 3% IPP) and 0.12 g of styrene were dissolved in 2 ml of tetrahydrofuran and stirred at 40° C. for 4 hours, cooled to room temperature and then precipitated with the use of hexane to prepare 0.5 g of diarylethene type polymer. Thus prepared polymer can be easily dissolved in dimethylformamide.

Example 9

A copolymer was prepared by repeating the same procedure as in Example 5 except that 0.6 g of polyethylene glycol monomethacrylate (molecular weight 350) was added. The yield of thus prepared copolymer was 60%.

Examples 10 to 13

Preparation of Photochromic Thin Film

Example 10

Figure 2:
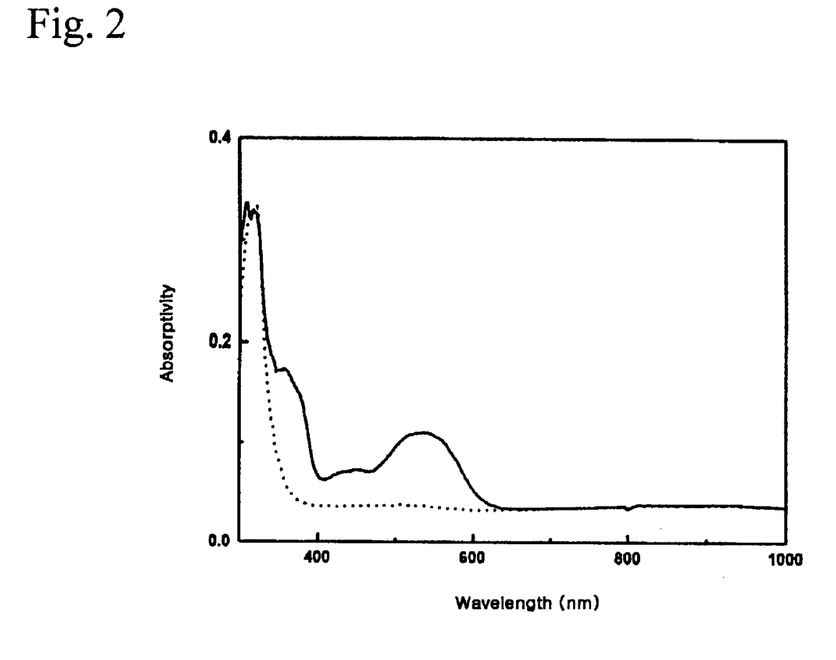
FIG. 2 is a variation of the absorption spectrum of the thin film prepared in Example 11 when exposed to radiation of a monochromatic wavelength of 310 nm (dashed line: before exposure to light, solid line: 1 minute after exposure to light).

0.5 g of the diarylethene derivative prepared in Example 5 was dissolved in 5 ml of xylene and 2 ml of toluene, stirred at room temperature for 1 hour and then concentrated until a 30% in weight reduction was reached. Thus prepared solution was filtered via a 0.45 micron injector filter and the resulting filtrate was applied to a glass plate by means of a spin coater and then dried in an oven at 50° C. under reduced pressure for 12 hours to obtain a transparent photochromic thin film which showed high adhesive properties and strength. The thin film, when exposed to radiation of light of more than 300 nm, changed color to red and maintained this red color after radiation was discontinued and stored in darkness. Even after the thin film was stored in darkness for more than six months, neither phase separation nor the formation of an aggregate was observed. Furthermore, no phase separation was found when irradiation was repeated. FIG. 2 illustrates a variation of the absorption spectrum of the thin film when exposed to radiation of a monochromatic wavelength of 310 nm.

Example 11

0.1 g of the diarylethene copolymer prepared in Example 6 was dissolved in 0.8 ml of xylene and 0.2 ml of toluene, and stirred at room temperature for 1 hour and then filtered through a 0.45 micron injector filter. The resulting filtrate was applied to a PC plate by means of a bar coater and then dried in an oven at 50° C. under reduced pressure for 12 hours to obtain a transparent photochromic thin film possessing high adhesive properties and strength. The thin film, when exposed to radiation of light of a monochromatic wavelength of 340 nm, changed color to red and maintained this red color after radiation was discontinued and stored in darkness. Even after the thin film was stored in darkness for more than six months, neither phase separation nor the formation of an aggregate was observed.

Example 12

Comparative Example

A polymethylmethacrylate polymer was prepared by reacting 1-(6'-methacrylooxyethyl-2'-methylbenzo[b] thiophen-3'-yl)-2-(2"-methylbenzo[b]thiophen-3"-yl) hexafluorocyclopentene (40% by weight) and methacrylate methyl ester (60% by weight) in techniques known (Japan Kokai Tokkyo Koho; JP 0/240242 A2). Thus prepared copolymer was dissolved in chloroform and applied to a glass plate to obtain a thin film, which was poor in its mechanical and adhesive properties.

Example 13

0.2 g of the diarylethene copolymer prepared in Example 8 was dissolved in a mixed solvent of 0.8 ml of xylene, 0.2 ml of tetrahydrofuran and ethylene glycol, and stirred at room temperature for 1 hour and then filtered through a 0.45 micron injector filter. The resulting filtrate was applied to a polyester film by means of a bar coater and then dried in an oven at 50° C. under reduced pressure for 12 hours to obtain a transparent photochromic thin film exhibiting high adhesive properties and strength. The thin film, when exposed to radiation of light of a monochromatic wavelength of 340 nm, changed color to red and maintained this red color after radiation was discontinued and stored in darkness. Even after the thin film was stored in darkness for more than six months, neither phase separation nor the formation of an aggregate was observed.

EFFECTS OF THE INVENTION

As previously mentioned, according to the present invention, it is possible to prepare a diarylethene styrene type copolymer exhibiting fast photo-induced color change and having good adhesive and processability properties and a photochromic thin film therefrom.

All of the numerical and quantitative measurements set forth in this application (including in the examples and in the claims) are approximations. For example, when the application refers to a temperature range from 50° C. to 200° C., the temperature range is actually from approximately 50° C. to approximately 200° C. Similarly, when the application refers to a range from 2 to 10 hours, the range is actually from approximately 2 to approximately 10 hours. The two preceding sentences set forth non-limiting examples because, as stated in the first sentence of this paragraph, all of the numerical and quantitative measurements set forth in this application (including in the examples and in the claims) are approximations.

What is claimed is:

1. A diarylethene compound of formula (1)

(I)

wherein $R_1$ is a hydrogen or a $C_{1-22}$ alkyl group, a fluoro group, a substituted or unsubstituted phenyl group, or a substituted or unsubstituted phenylalkyl group, $R_2$ is a $C_{1-22}$ alkylene group which is unsubstituted or substituted with fluorine, $R_3$ is a $C_{1-3}$ alkylene group which is unsubstituted or substituted with an oxygen or fluorine atom, X and Y independently of one another are an oxygen, a nitrogen, or a sulfur atom, Z is a methylene group or a carbonyl group which is unsubstituted or substituted with fluorine, and a equals zero or one.

2. A diarylethene compound of formula (1) as claimed in claim 1, wherein a is one.

3. A diarylethene compound of formula (1) as claimed in claim 1, wherein $R_3$ is a $C_{1-3}$ alkylene group which is substituted with a fluorine atom; and wherein Z is a methylene group that is substituted with fluorine.

4. A diarylethene compound of formula (1) as claimed in claim 3, wherein a is one.

5. A method for producing a photochromic diarylethene compound, wherein the photochromic diarylethene compound is the diarylethene compound of formula (1) as claimed in claim 1, wherein the method comprises reacting a diarylethene compound of formula (5)

(5)

wherein $R_3$, X, Y and Z are defined as in claim 1, with acetyl chloride to form a mono acetyl-substituted diarylethene of formula (6)

(6)

wherein $R_3$, X, Y, and Z are defined as in claim 1, hydrating the mono acetyl-substituted diarylethene to form a hydration product, and then reacting the hydration product with a methacryl-substituted alkylene alcohol to obtain the diarylethene compound of formula (1).

6. A method as claimed in claim 5, wherein the hydration product is reacted with the methacryl-substituted alcohol at a temperature of approximately −10° C. to approximately 150° C. for approximately 0.5 to approximately 24 hours.

7. A method as claimed in claim 5, wherein the hydration product is reacted with the methacryl-substituted alcohol at a temperature of approximately 0° C. to approximately 100° C. for approximately 1 to approximately 10 hours.

8. A method as claimed in claim 5, wherein the hydration product is reacted with the methacryl-substituted alcohol at a temperature of approximately 10° C. to approximately 30° C. for approximately 4 to approximately 6 hours.

9. A diarylethene compound of formula (1)

(I)

wherein $R_1$ is a hydrogen or a substituted or unsubstituted $C_{1-22}$ alkyl group, a fluoro group, a substituted or unsubstituted phenyl group, or a substituted or unsubstituted phenylalkyl group,

$R_2$ is a $C_{1-22}$ alkylene group which is unsubstituted or substituted with fluorine, $R_3$ is O, S, or a $C_{1-3}$ alkylene group which is unsubstituted or substituted with one or more oxygen atoms or fluorine atoms, X and Y independently of one another are O, S, nitrogen, and Z is a carbonyl group or a methylene group which is unsubstituted or substituted with fluorine.

10. A diarylethene compound of formula (1) as claimed in claim 9, wherein a is one.

11. A diarylethene compound of formula (1) as claimed in claim 9, wherein $R_3$ is a $C_{1-3}$ alkylene group which is substituted with a fluorine atom; and wherein Z is a methylene group that is substituted with fluorine.

12. A diarylethene compound of formula (1) as claimed in claim 11, wherein a is one.

13. A method for producing a photochromic diarylethene compound, wherein the photochromic diarylethene compound is the diarylethene compound of formula (1) as claimed in claim 9, wherein the method comprises reacting a diarylethene compound of formula (5)

(5)

wherein $R_3$, X, Y and Z are defined as in claim 9, with acetyl chloride to form a mono acetyl-substituted diarylethene of formula (6)

(6)

wherein $R_3$, X, Y, and Z are defined as in claim 9, hydrating the mono acetyl-substituted diarylethene to form a hydration product, and then reacting the hydration product with a methacryl- or acryl-substituted alkylene alcohol of formula (7)

(7)

wherein $R_1$ and $R_2$ are defined as in claim 9, to obtain the diarylethene compound of formula (1).

14. A method as claimed in claim 13, wherein the hydration product is reacted with the alcohol of formula (7) at a temperature of approximately −10° C. to approximately 150° C. for approximately 0.5 to approximately 24 hours.

15. A method as claimed in claim 13, wherein the hydration product is reacted with the alcohol of formula (7) at a temperature of approximately 0° C. to approximately 100° C. for approximately 1 to approximately 10 hours.

16. A method as claimed in claim 13, wherein the hydration product is reacted with the alcohol of formula (7) at a temperature of approximately 10° C. to approximately 30° C. for approximately 4 to approximately 6 hours.

17. A method for producing a photochromic-diarylethene copolymer of formula (4):

(4)

wherein the method comprises dissolving in an organic solvent a diarylethene compound of formula (1) as claimed in claim 1 and at least one compound selected from the group consisting of a styrene monomer of formula (2)

(2)

and a compound of formula (3)

(3)

to yield a resulting solution, adding a heat-curing agent to the resulting solution to yield a resulting mixture, and then slowly heating the resulting mixture with a radical polymerization initiator at a temperature in a range from approximately 30° C. to approximately 400° C. for approximately 0.5 to approximately 10 hours to obtain the photochromic diarylethene-type copolymer of formula (4), wherein in the method $R_1, R_2, R_3$, X, Y, and Z are defined in claim 1, wherein $R_4$ is the same as $R_1$, or is a $C_{1-22}$ alkylene or akyleneoxyalkyl ester group which is unsubstituted or substituted with fluorine, wherein said alkylene group or alkyleneoxyalkyl ester group is optionally substituted with at least one substituent selected from the group consisting of a methacryl group, an acryl group, and a difluoroacryl, wherein $R_5$ is the same as $R_2$, or is a $C_{1-22}$ alkyleneoxy group which is unsubstituted or substituted with fluorine, and wherein o, p, q, and r independently of one another are a number from 0 to 1 and represent a molar fraction, provided o+p+q+r=1 and o is not 0.

18. A method according to claim 17, wherein said organic solvent is at least one solvent selected from the group consisting of tetrahydrofuran, toluene, $C_{1-10}$ alcohol, acetonitrile, acetone, dimethylsulfoxide, dimethylformamide, α-methylnaphthalene, methoxynaphthalene, chloronaphthalene, diphenylethane, ethyleneglycol, quinoline, dichlorobenzene, dichlorotoluene, propylene carbonate, sulfolane, and xylene.

19. The photochromic diarylethene copolymer of formula (4) as claimed in claim 17, wherein the photochromic diarylethene copolymer of formula (4) is produced by the method claimed in claim 17.

20. A method for producing a photochromic diarylethene copolymer of formula (4):

(4)

wherein the method comprises mixing in an organic solvent a diarylethene compound of formula (1) as claimed in claim 9 and at least one compound selected from the group consisting of a styrene monomer of formula (2)

(2)

and a compound of formula (3)

(3)

to yield a resulting solution, adding a heat-curing agent to the resulting solution to yield a resulting mixture, and then slowly heating the resulting mixture with a radical polymerization initiator at a temperature in a range from approximately 30° C. to approximately 400° C. for approximately 0.5 to approximately 150 hours to obtain the photochromic diarylethene copolymer of the formula (4), wherein in the method $R_1$, $R_2$, $R_3$, X, Y and Z are defined in claim 9, wherein $R_4$ is the same as $R_1$, or is a $C_{1-22}$ alkylene or akyleneoxyalkyl ester group which is unsubstituted or substituted with fluorine, wherein said alkylene group or alkyleneoxyalkyl ester group is optionally substituted with at least one substituent selected from the group consisting of a methacryl group, an acryl group, and a difluoroacryl, wherein $R_5$ is the same as $R_2$, or is a $C_{1-22}$ alkyleneoxy group which is unsubstituted or substituted with fluorine, and wherein o, p, q, and r independently of one another are a number from 0 to 1 and represent a molar fraction, provided that o+p+q+r=1 and o is not 0.

21. A method according to claim 20, wherein said organic solvent is at least one solvent selected from the group consisting of tetrahydrofuran, toluene, $C_{1-10}$ alcohol, acetonitrile, acetone, dimethylsulfoxide, dimethylformamide, α-methylnaphthalene, methoxynaphthalene, chloronaphthalene, diphenylethane, ethyleneglycol, quinoline, dichlorobenzene, dichlorotoluene, propylene carbonate, sulfolane, and xylene.

22. The photochromic diarylethene copolymer of formula (4) as claimed in claim 20, wherein the photochromic diarylethene copolymer of formula (4) is produced by the method claimed in claim 20.

\* \* \* \* \*